United States Patent [19]

Sogabe

[11] 4,361,309
[45] Nov. 30, 1982

[54] ELECTROMAGNETIC ACTUATOR

[75] Inventor: Ichita Sogabe, Gifu, Japan

[73] Assignee: Niipondenso Co., Ltd., Kariya, Japan

[21] Appl. No.: 275,507

[22] Filed: Jun. 19, 1981

[30] Foreign Application Priority Data

Jun. 23, 1980 [JP] Japan ................................ 55/84706
Jun. 23, 1980 [JP] Japan ................................ 55/84707

[51] Int. Cl.³ .................. F16K 31/06; H01F 7/16
[52] U.S. Cl. .................................. 251/137; 251/282; 335/267
[58] Field of Search .............. 251/137, 282; 335/256, 335/266, 267; 123/585

[56] References Cited

U.S. PATENT DOCUMENTS

| 2,901,210 | 8/1959 | Hebard | 251/137 |
| 2,935,663 | 5/1960 | Pollak | 335/256 X |
| 3,275,964 | 9/1966 | Kumm | 251/137 X |

FOREIGN PATENT DOCUMENTS 2261278  6/1974  Fed. Rep. of Germany ...... 251/137

Primary Examiner—Arnold Rosenthal
Attorney, Agent, or Firm—Cushman, Darby & Cushman

[57] ABSTRACT

An electromagnetic valve actuator has two sets of exciting coils and movable cores and a rod having an end secured to the first movable core. The other end of the rod extends slidably through the second movable core which is connected to a valve member cooperative with a valve seat to control a fluid flow therethrough. A first spring biases the rod and the first movable core away from the valve member, whereas a second spring biases the valve member and the second movable core away from the rod. The arrangement is such that the valve member is positioned at a first position in contact with the valve seat when the first coil is energized, such that the valve member is positioned at a second position remote from the valve seat when the second coil is energized and such that the valve member is positioned at a third position between the first and second positions when both coils are deenergized.

12 Claims, 8 Drawing Figures

ELECTROMAGNETIC ACTUATOR

BACKGROUND OF THE INVENTION

The present invention relates to an electromagnetic actuator of the type that has a pair of exciting coils and is operative to actuate an output member in two directions. The invention also relates to an electromagnetic actuator and valve assembly which can be used, for example, to control the flow of air into an internal combustion engine.

SUMMARY OF THE INVENTION

It is an object of the present invention to provide an electromagnetic actuator of the type that has two exciting coils and wherein all the movable components of the actuator are held stationary when the coils are both deenergized.

It is another object of the present invention to provide an electromagnetic actuator and valve assembly wherein the actuator is of the type that has two exciting coils and wherein a valve member is held at a position remote from an associated valve seat when the coils are both deenergized.

According to one feature of the present invention, there is provided an electromagnetic actuator comprising a substantially cylindrical housing, first and second exciting coils disposed in said housing in axially aligned relationship, a fixed core having first and second poles positioned radially inwardly of said first and second coils, respectively, said fixed core defining therein an axial through-hole extending through said first and second poles, an axially elongated rod extending slidably through said axial through-hole, a first movable core disposed to cooperate with said first pole to define a first air gap and fixed to said rod adjacent to one end thereof for axial movement with said rod, stop means provided on said housing adjacent to said first movable core, first biasing means for resiliently biasing said first movable core axially toward said stop means, a second movable core disposed to cooperate with said second pole to define a second air gap and mounted on said rod for axial sliding movement thereon, said second movable core being adapted to be connected with a member to be actuated by said actuator, second biasing means operative to bias said second movable core in the axial direction opposite to the direction in which said first movable core is biased by said first biasing means, and means for limiting the relative movement between said rod and said second movable core away from each other, said first biasing means being operative, when said first and second exciting coils are deenergized, to axially move said first movable core and said rod against the action of said second biasing means until said first movable core is urged against said stop means whereby all the movable components of said actuator are held stationary.

According to another feature of the invention, there is provided an electromagnetic actuator and valve assembly which includes:

an electromagnetic actuator;
valve means operatively connected to said actuator and actuated thereby to control the fluid flow through said valve means;
said actuator comprising;
a substantially cylindrical housing, first and second exciting coils disposed in said housing in axially aligned relationship, a fixed core having first and second poles positioned radially inwardly of said first and second coils, respectively, said fixed core defining therein an axial through-hole extending through said first and second poles, an axially elongated rod extending slidably through said axial through-hole, a first movable core disposed to cooperate with said first pole to define a first air gap and fixed to said rod adjacent to one end thereof for axial movement with said rod, stop means provided on said housing adjacent to said first movable core, first biasing means for resiliently biasing said first movable core axially toward said stop means, a second movable core disposed to cooperate with said second pole to define a second air gap and mounted on said rod for axial sliding movement thereon;

said valve means comprising;
a valve housing connected to the end of said actuator housing adjacent to said second movable core and defining fluid inlet and outlet and a fluid passage extending between said fluid inlet and outlet, a valve seat in said fluid passage between said fluid inlet and outlet and a valve member disposed in said fluid passage and connected to said second movable core of said actuator for movement therewith to cooperate with said valve seat to control the fluid flow through said fluid passage;

second biasing means operative to bias said second movable core in the axial direction opposite to the direction in which said first movable core is biased by said first biasing means; and means for limiting the relative movement between said rod and said second movable core away from each other;

the arrangement being such that said valve member is positioned at a first position in contact with said valve seat when said first coil is energized, such that said valve member is positioned at a second position remote from said valve seat when said second coil is energized and such that said valve member is positioned at a third position between said first and second positions when said first and second coils are both deenergized.

The above and other objects, features and advantages of the present invention will be made more apparent by the following description with reference to the accompanying drawings.

BRIEF DESCRIPTION OF THE DRAWINGS

FIGS. 1-3 are axial sectional views of a fluid flow control valve embodying the present invention, wherein FIG. 1 shows respective movable members at positions taken when first and second exciting coils are both deenergized, FIG. 2 shows the movable member at positions taken when the first coil only is energized and FIG. 3 shows the movable members at positions taken when the first and second coils are both energized;

FIGS. 6-8 are axial sectional views of an electromagnetic actuator embodying the present invention, wherein FIG. 6 shows movable members of the actuator at positions taken when first and second exciting coils are both deenergized, FIG. 7 shows the movable members at positions taken when the first coil only is energized and FIG. 8 shows the movable members at position taken when the second coil only is energized.

DESCRIPTION OF PREFERRED EMBODIMENTS

Figure 1:
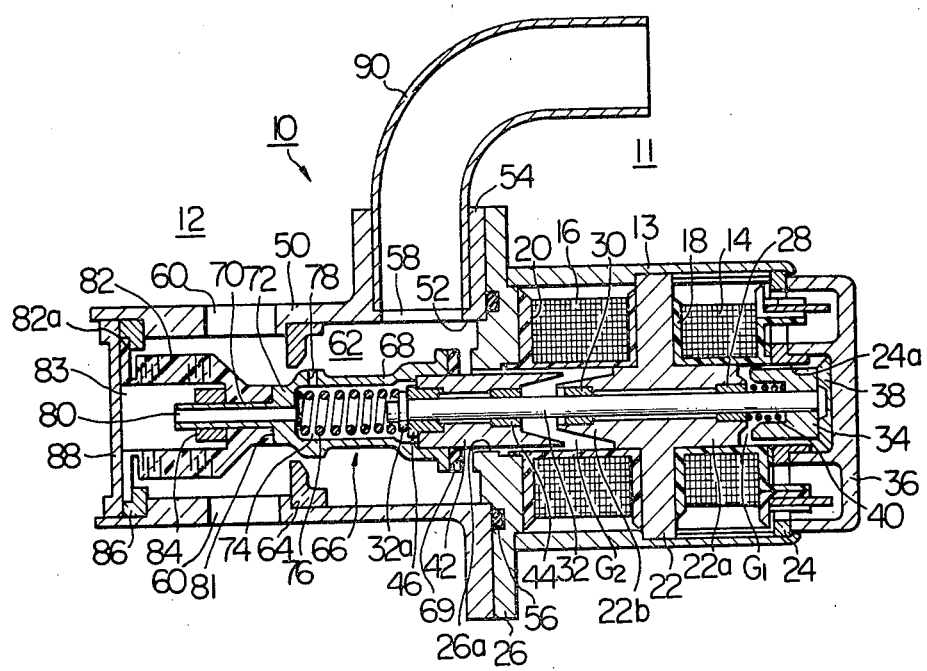

Referring first to FIG. 1 of the drawings, a fluid flow control valve 10 embodying the present invention comprises an electromagnetic actuator section 11 and a valve section 12.

The actuator section 12 includes a substantially cylindrical housing 13 in which first and second exciting coils 14 and 16 are disposed in axially spaced relationship and respectively accomodated in bobbin-shaped coil spools 18 and 20 of an insulating material such as a plastic material. A fixed core 22 is disposed between the coil spools 18 and 20 and has first and second integral poles 22a and 22b which are disposed radially inwardly of the coil spools 18 and 20, respectively. The fixed core 22 is secured at its outer peripheral edge portion to the housing 13. Yorks 24 and 26 are secured to the opposite ends of the housing 13 to complete the magnetic circuits of the first and second exciting coils 14 and 16, respectively.

The fixed core 22 defines therein an axial through-hole through which an axially elongated rod 32 extends and is slidably mounted on the fixed core by means of bearings 28 and 30. The rod 32 has its opposite ends extending out of the first and second poles 22a and 22b. The first york 24 defines therein an axial hole 24a which is axially aligned with the axial bore defined in the first coil spool 18. A first movable core 34 is disposed in the axial hole 24a and so positioned as to cooperate with the first pole 22a to define a gap $G_1$ therebetween. The movable core 34 is secured to the rod 32 adjacent to one end thereof and axially movable therewith in the axial hole 24a. A cover 36 is secured to the outer surface of the first york 24 to form an end closure which is a part of the housing 13. A stop 38 is mounted on the inner surface of the central section of the cover 36 and directed to the outer end face of the first movable core 34. The core 34 is formed of a cup-shaped member defining a recess which is axially inwardly open. A compression coil spring 40 is disposed between the bottom of the recess in the movable core 34 and the bearing 28 in the first pole 22a and extends around the right end portion of the rod 32 to resiliently bias the first movable core 34 rightward as viewed in FIG. 1 toward the stop 38.

The second york 26 defines therein an axial hole 26a which is axially aligned with the axial bore defined in the second coil spool 20. A second movable core 42 is disposed in the axial hole 26a and so positioned as to cooperate with the second pole 22b to define a second gap $G_2$ therebetween. The core 42 is mounted on the left end portion of the rod 32 by means of bearing 44 and 46 so that the second movable core 42 and the rod 32 are slidably movable relative to each other.

The valve section 12 includes a substantially cylindrical valve housing 50 having an end (right end) which defines an opening 52 therein. An annular flange 54 extends radially outwardly from the peripheral edge of the opening 52 and is secured to the second york 26 of the actuator 11 by means of screws (not shown). A seal ring 56 is interposed between the flange 54 and the york 26 to provide an air tight seal therebetween. The peripheral wall of the valve housing 50 is formed therein with a fluid inlet 58 and fluid outlets 60. The fluid inlet 50 is positioned adjacent to the opening 52. The fluid outlets 60 are spaced from the inlet 50 in the axial direction of the valve housing. The valve housing defines therein a fluid passage 62 which is coaxial with the opening 52 and extends between the fluid inlet and outlets 58 and 60. An annular valve seat 64 is provided in the fluid passage 62 between the fluid inlet and outlets.

The left end portion of the second movable core 42 of the actuator 11 extends through the axial hole 26a in the second york 26 and through the end opening 52 in the valve housing 50 into the fluid passage 62. An axially elongated and hollow valve member 66 is provided in the fluid passage 62 for axial movement therein and includes a larger diameter portion 68 positioned rightward of the valve seat 64, i.e., adjacent to the fluid inlet 58, and a smaller diameter portion 70 which extends leftward through the valve seat 64. The rightmost end (open end) of the larger diameter portion 68 of the valve member 66 secured to the leftmost end of the second movable core 42 of the actuator 11 so that the valve member is movable with the core 42. The valve member 66 is provided with an annular shoulder 72 between the larger and smaller diameter portions 68 and 70. The shoulder 72 is cooperative with the valve seat 64 to control the flow of the fluid through the fluid passage 62.

The larger diameter portion 68 of the valve member 66 defines therein a space 74 which accomodates the leftmost end of the rod 32 and an annular flange 32a extending radially outwardly therefrom. The flange 32 is provided to limit the relative movement between the rod 32 and the second movable core 42 and thus the valve member 66. The space 74 also accomodates a second compression coil spring 76 having a spring force smaller than that of the compression coil spring 40 discussed previously. The spring 76 extends between the bottom or inner end of the space 74 and the flange 32a to resiliently bias the valve member 66 and the rod 32 leftward so that the bearing 46 is kept in contact with the flange 32a.

An aperture 78 is formed in the peripheral wall of the larger diameter portion 68 of the valve member 66 to communicate the space 74 therein with the fluid passage 62 upstream of the valve seat 64. An axial bore 80 is formed in the smaller diameter portion 70 of the valve member 66 and extends from the left end face of the valve member 66 to the space 74. An axially expansible bellows member 82 is disposed within the valve housing 50 downstream of the valve seat 64. The smaller diameter portion 70 of the valve member 66 extends into the bellows member 82 through the right end thereof and is sealingly secured thereto by means of a second annular shoulder 81 on the valve member and a fixing nut 84 screwed over the smaller diameter portion 70 to tighten the right end of the bellows member against the annular shoulder 81. The other end of the bellows member 82 is provided with an annular flange 82a which is sealingly clamped between an end plate 88 of the valve housing 50 and a ring 86 inserted into the housing 50 adjacent to the end plate. The bellows member 82 defines therein a space 83 which is always communicated with the fluid passage 62 upstream of the valve seat 64 through the axial bore 80, the space 74 and aperture 78 formed in the valve member 66. This feature assures that, even when the valve member 66 is in sealing engagement with the valve seat 64, the fluid pressure difference across the valve seat will not urge the valve member 66 against the valve seat 64. In other words, the fluid pressure in the bellows member 82 will axially expand the same so that the bellows member exerts a force to the valve member 66 to bias the same in the axial direction which is opposite to the direction in which the pressure difference across the valve seat 64 tends to urge the valve member against the valve seat 64. Accordingly, the fluid pressure difference across the valve seat will not form a load on the actuator 11.

The flow control valve 10 discussed above may be used, for example, to control the air supply into an internal combustion engine in compliance with operation conditions of the engine. As an example of the application, the control valve 10 may be mounted on an engine such that the fluid passage 62 bypasses a throttle valve (not shown) of the intake system of the engine. The fluid inlet 58 may be connected through a conduit 90 to the air intake system of the engine upstream of the throttle valve (for example, the upstream end of the conduit 90 may be connected to an air cleaner), while the fluid outlets 60 may be connected to the air intake system downstream of the throttle valve (for example, to the intake manifold of the engine). However, the application of the flow control valve 10 to an air intake system of an internal combustion engine does not form a part of the present invention and, thus, will not be described further.

The operation of the flow control valve 10 will be discussed hereunder.

Figure 4:
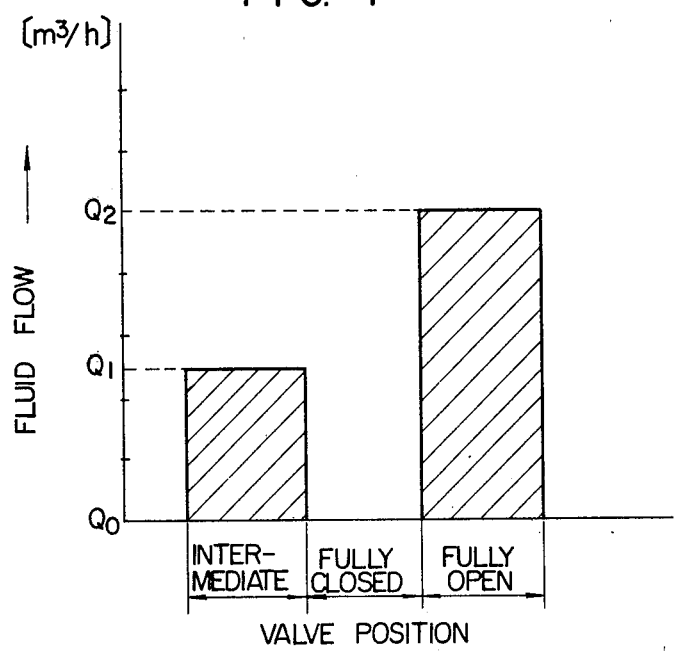
FIG. 4 is a graphical illustration of the fluid flow control characteristic of the control valve obtained in the case where the electric supply to the exciting coils of the valve is simply switched on and off.

When the first and second exciting coils 14 and 16 of the actuator 11 are both deenergized, the first movable core 34 is urged by the spring 40 against the stop 38, as shown in FIG. 1. In this case, the force of the spring 40 is transmitted through the rod 32 and the flange 32a to the second movable core 42 and the valve member 66, so that the annular shoulder 72 is held at a position slightly spaced from the valve seat 64 rightward, as viewed in FIG. 1. This position of the valve member 66 is intermediate between "fully closed" position and "fully open" position to be discussed later. This "intermediate" valve position will provide a fluid flow $Q_1$ (see FIG. 4) through the gap defined between the valve member 66 and valve seat 64.

As described, the valve member 66 will be kept spaced from the associated valve seat 64 when the first and second coils 14 and 16 are both deenergized. Thus, even if the flow control valve 10 is used as an intake air control valve of an internal combustion engine mounted on a motor vehicle operated in a cold district, the valve member 66 will never be frozen to the valve seat 64 during the time while the engine is not in operation.

Figure 2:
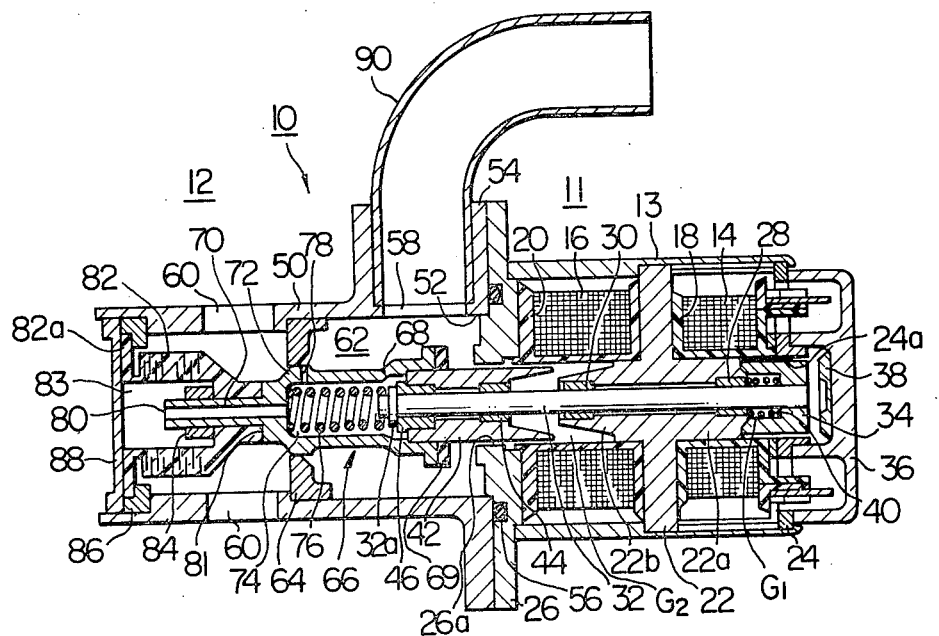

When the valve member 66 is positioned as shown in FIG. 1, if the first coil 14 only is energized, the first movable core 34 is driven leftward against the spring 40 and urged against the first pole 22a of the fixed core 22. The core 34 will be held in this position during the time while the first coil is energized. The leftward movement of the first movable core 34 is transmitted through the rod 32 and the compression spring 76 to the valve member 66, so that the valve member is displaced leftward together with the second movable core 42 until the inclined shoulder 72 of the valve member 66 is resiliently urged against the valve seat 64, as shown in FIG. 2. This valve position is "fully closed" position and blocks the fluid flow through the valve, as indicated by "fluid flow $Q_0$" in FIG. 4.

Figure 3:
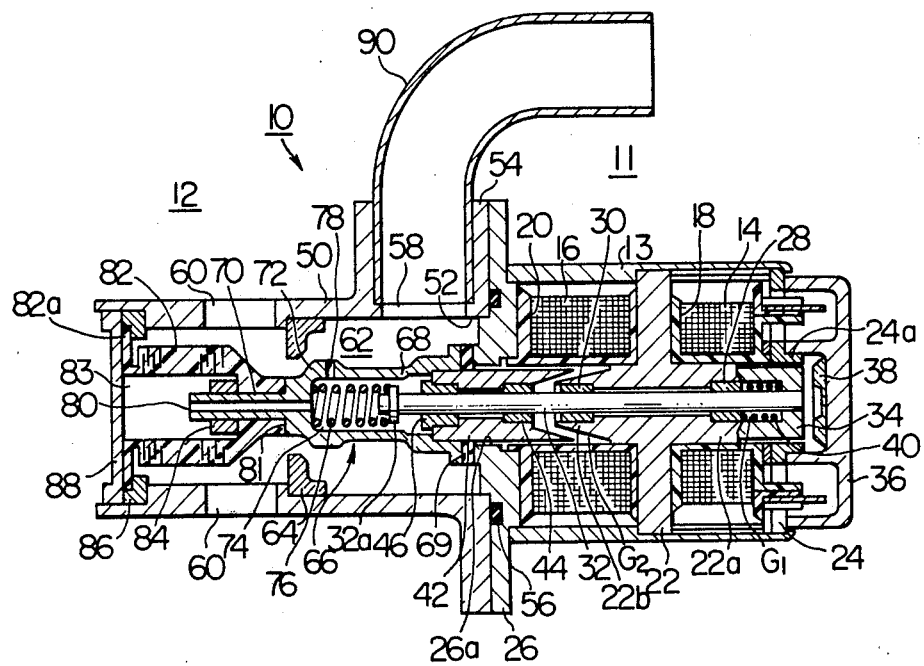

With the valve position shown in FIG. 2, i.e., when the first coil 14 only is energized to place the valve member 66 at the fully closed position, if the second coil 16 is also energized, the second movable core 42 will be driven rightward on the rod 32 to move the valve member 66 away from the valve seat 64 against the action of the spring 76 until a shock-absorbing pad 69 attached to the open end of the valve member 66 is engaged by the second york 26 of the actuator, as shown in FIG. 3. This valve position is "fully open" position and provides the maximum fluid flow through the valve, as shown by "fluid flow $Q_2$" in FIG. 4.

The maximum fluid flow $Q_2$ can also be obtained by first keeping the first and second coils 14 and 16 both deenergized, as shown in FIG. 1, and then energizing the second coil 16 only.

As described, the valve member 66 of the flow control valve 10 is actuated by the electromagnetic actuator 11 such that the valve member takes a "fully closed position" providing a fluid flow of zero ($Q_0$), a "fully open position" providing the maximum fluid flow ($Q_2$) and an "intermediate position" providing a medium fluid flow ($Q_1$).

The flow control valve 10 may alternatively be operated such that the valve provides fluid flow which is proportional to the electric power supply to the first and second coils 14 and 16, as will be discussed in more detail hereunder.

Figure 5:
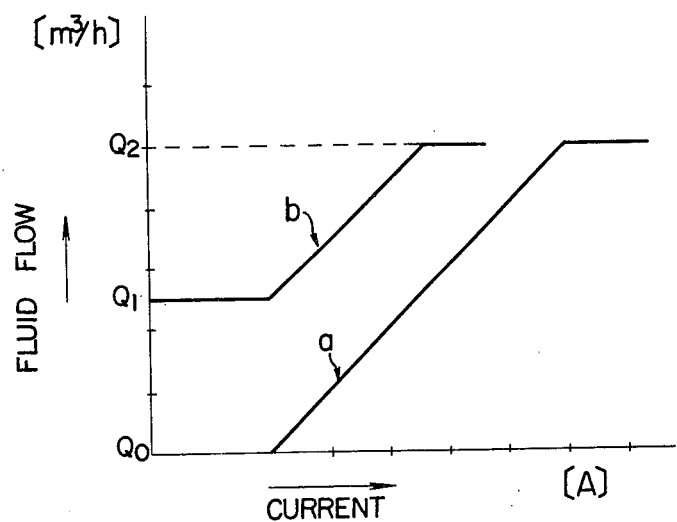
FIG. 5 is a graphical illustration of the operation characteristic of the valve obtained in the case where the electric supply to the coils of the valve is gradually increased and decreased to cause the valve to be operated as a proportional valve.

Assuming that the first coil 14 only is being energized to place the valve member 66 at the fully closed position shown in FIG. 2, if power supply to the second coil 16 is commenced and gradually increased beyond a predetermined value, the second movable core 42 and the valve 66 are moved rightward away from the valve seat 64 against the spring 76. Further increase of the electric power supply to the second coil 16 increases the degree of the valve opening in proportion to the electric power supply to the second coil 16, with a result that the fluid flow through the gap between the valve seat 64 and the valve member 64 is increased as shown by a line a in FIG. 5 in proportion to the electric current until the fluid flow reaches the maximum flow $Q_2$.

A similar proportional control can be started from the valve position shown in FIG. 1 in which the first and second coils are both deenergized and the valve member 66 is spaced from the valve seat 64 to the "intermediate position" to provide the fluid flow $Q_1$. With the valve member 66 being located at this position, if the electric power supply to the second coil 16 is started and gradually increased, the fluid flow through the valve will be gradually incrased, as shown by a line b in FIG. 5, until the fluid flow reaches the maximum flow $Q_2$. It must be noted that the electric power supply which increases the fluid flow from $Q_1$ to $Q_2$ is much less than the electric power supply required to increase the fluid flow from $Q_0$ to $Q_2$. This is quite advantageous particularly with the case where the flow control valve 10 is mounted on an internal combustion engine to control the air supply into the engine. More specifically, it is known that the maximum electric current is required for the starting of the internal combustion engine. With this in mind, it will be appreciated that, compared with the electric power supply required to energize the two coils 14 and 16 to obtain the maximum fluid flow $Q_2$, the electric power supply required to energize one of the coils 16 only to obtain the same fluid flow $Q_2$ provides a much smaller load on the electric power source, i.e., a battery, to thereby ensure that the maximum fluid flow through the valve can easily be obtained even when the battery is at a lowered voltage.

The flow control valve 10 has been described in conjunction with an internal combustion engine. The application of the valve 10, however, is not limited to internal combustion engines. The valve 10 can be used with any other machines and devices which utilize the flow control characteristics shown in FIGS. 4 and 5.

Figure 6:
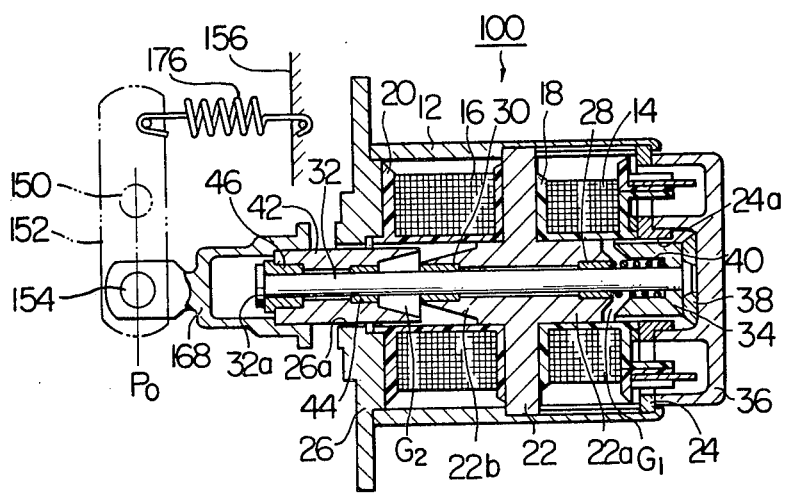
Figure 7:
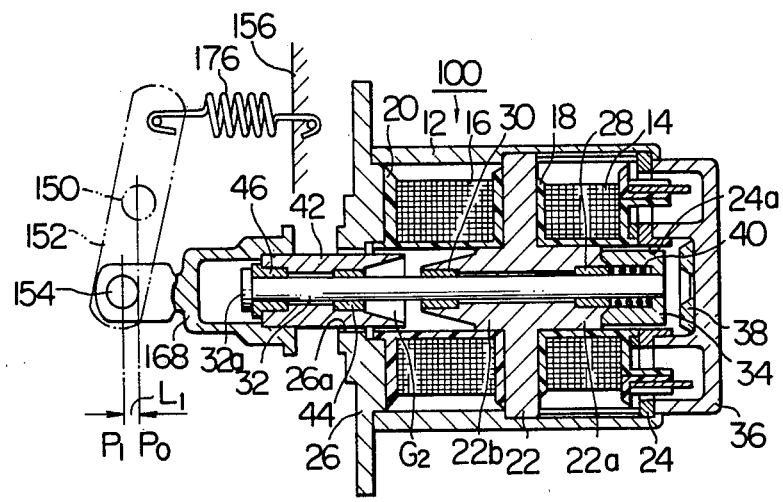
Figure 8:
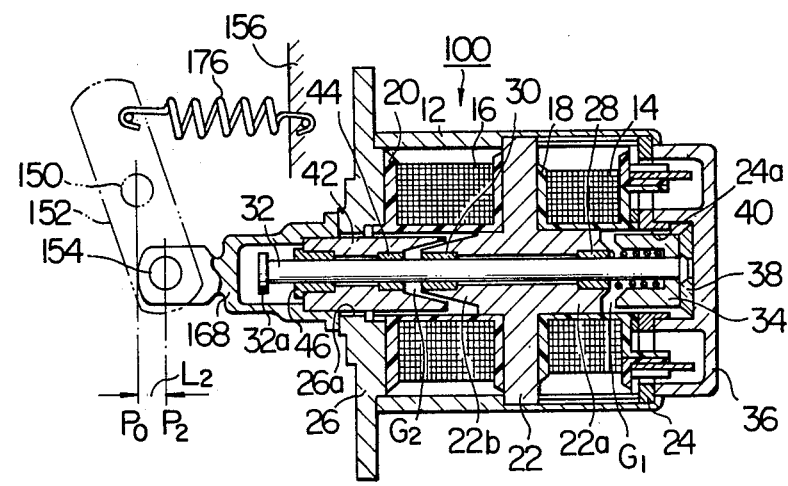

FIGS. 6 to 8 illustrate another embodiment generally designated by 100. This embodiment comprises an electromagnetic actuator which is almost identical with the actuator 11 of the fluid flow control valve 10 of the preceding embodiment. Thus, the parts of the second embodiment 100 similar to those of the actuator 11 of the first embodiment are designated by the same reference numerals. The actuator of the second embodiment will be described hereunder in conjunction with a linkage provided between the actuator and a device which is to be actuated.

The second movable core 42 of the actuator is secured at its outer periphery to the inner peripheral surface of an open end of a cup-shaped connecting or output member 168, the other end of which is pivotally connected by a pin 154 to an input end of a driven member which is shown in the illustrated embodiment as a level member 152 rotatable with an axle 150. That end of the lever 152 which is remote from the end thereof pivotally connected to the output member 168 is connected through a tension coil spring 176 to a stationary base 156 which provides a support for the actuator 100. Thus, the tension spring 176 is operative to resiliently bias the second movable core 42 axially leftward and tend to move the core 42 away from the rod 32. However, the flange 32a is provided on the left end of the rod 32 so that the relative movement between the rod 32 and the second movable core 42 (and thus between the rod 32 and the output member 168) is limited to the extent where the bearing 46 is engaged by the flange 32a, as discussed previously. After the bearing 46 and the flange 32a are engaged, therefore, the first movable core 34, the rod 32, the second movable core 42, the output member 168 and the lever 152 are momentarily united or connected together to form a unitary link. The compression coil spring 40 is designed to have its spring force which is greater than that of the tension spring 176. Thus, if the first and second coils 14 and 16 are both deenergized, the coil spring 40 moves the unitary link against the spring 176 to the rightmost end of the stroke of the link, i.e., to a position in which the first movable core 34 is engaged by the stop 38 and in which all the movable elements of the unitary link are stably held stationary.

The operation of the actuator 100 will now be described hereunder. FIG. 6 shows the movable members at positions taken when the first and second coils 14 and 16 are both deenergized. In this case, the unitary link constituted by the first movable core 34, the rod 32, the second movable core 42, the output member 168 and the lever 152 is displaced by the spring 40 to the rightmost end of the stroke of the unitary link, namely, to the position in which the first movable core is engaged by the stop 38 and in which the link is held stationary. In this position of the unitary link, the bearing 46 of the second movable core 42 is held in engagement with the flange 32a of the rod 32 due to the action of the spring 176. The pin 154 interconnecting the output member 168 and the lever 152 is located at a position indicated by $P_0$ in FIG. 6.

With the movable members positioned as shown in FIG. 6, if the first coil 14 is energized, the coil drives the first movable core 34 and the rod 32 leftward against the spring 40 until the core 34 is engaged with the first pole 22a of the fixed core 22. Since the spring force of the spring 176 acts through the lever 152 and the pin 154 on the second movable core 42 and the output member 168, the leftward movement of the first movable core 34 and the rod 32 as caused by the energization of the first coil 14 will allows the second movable core 42 and the output member 176 to be moved leftward by the action of the spring 176 while the bearing 46 is kept in engagement with the flange 32a of the rod 32. By this leftward movement, the pin 154 is moved a distance L1 from its intermediate position $P_0$ to a left position P (see FIG. 7).

When the movable members are located at positions shown in FIG. 6, if the second coil 16 only is energized, the second movable core 42 is driven rightward against the force of the spring 176 and moved on the rod 32 to displace the output member 168 rightward until the open end of the output member is engaged by the left end face of the york 26. The rightward movement of the core 42 and the output member 168 is independent of the rod 32 and the first movable core 34 and causes the pin 154 to be displaced from the left position $P_1$ to the right position $P_2$ by a distance equal to the strokes L1 plus L2.

As described, the actuator 100 is advantageously arranged such that the pin 154 interconnecting the output member 168 and the lever 152 is stably positioned at the intermediate position $P_0$ when the first and second exciting coils 14 and 16 are both deenergized. In addition, the actuator 100 has a wide variety of applications because the actuator is operative not only to exert forces to the pin 154 in two directions, i.e., leftward from the position $P_0$ toward the position $P_1$ as well as rightward from the position $P_0$ toward the position $P_2$, but also to give the pin 154 three kinds of strokes, namely, a stroke L1 from the position $P_0$ to the position $P_2$, a stroke L2 from the position $P_0$ to the position $P_2$, and a double stroke (L1+L2) from the position $P_1$ to the position $P_2$. Moreover, the actuator 100 does not need any positive output member-positioning means which exerts a load on the exciting coils of the actuator. Accordingly, the exciting coils can be of smaller output capacities with a resultant advantage that the actuator 100 can be of a reduced size and of a lightweight.

In the illustrated embodiment of the invention, the output member 168 of the actuator 100 is operatively connected through the lever 152 to the axle 150 to rotatably drive the same. Such a mechanical structure can advantageously be utilized to actuate a damper used, for example, in an automotive air-conditioner to switch over warm air to cold air and vice versa. The structure described above can also be utilized as an actuator for an electric fuel injector control device used with a diesel engine to control the fuel supply to the engine in compliance with stoppage, normal operation and starting of the engine. Moreover, the actuator described can also be utilized as a normal solenoid valve or as an electromagnetic contactor.

In the case where a device (for example, a door locking device) to be actuated by the actuator 100 is provided with a biasing means which is similar in function to the spring 176 used in the described embodiment of the invention, the biasing means may be used in place of the spring 176. The biasing means is not limited to a spring member but may be in any form of biasing means which would act against the spring 40. As an example, the biasing means may be in the form of a gravityoperated, fluid pressure-operated or electromagnetically operated biasing means.

The location of the spring 176 is not limited to the position shown. More specifically, the spring 176 is intended to bias the output member 168 leftward and, thus, may be replaced by another spring member disposed, for example, between the left end face of the york 26 and the open end of the output member 168.

Furthermore, the actuator 100 may be operated as a "linear solenoid" in which the first and second exciting coils 14 and 16 are subjected to chopping control to continuously and steplessly adjust the position of the pin 154 between the positions $P_0$–$P_1$, $P_0$–$P_2$ or $P_1$–$P_2$.

What is claimed is:

1. An electromagnetic actuator comprising a substantially cylindrical housing, first and second exciting coils disposed in said housing in axially aligned relationship, a fixed core having first and second poles positioned radially inwardly of said first and second coils, respectively, said fixed core defining therein an axial through-hole extending through said first and second poles, an axially elongated rod extending slidably through said axial through-hole, a first movable core disposed to cooperate with said first pole to define a first air gap and fixed to said rod adjacent to one end thereof for axial movement with said rod, stop means provided on said housing adjacent to said first movable core, first biasing means for resiliently biasing said first movable core axially toward said stop means, a second movable core disposed to cooperate with said second pole to define a second air gap and mounted on said rod for axial sliding movement thereon, said second movable core being adapted to be connected with a member to be actuated by said actuator, second biasing means operative to bias said second movable core in the axial direction opposite to the direction in which said first movable core is biased by said first biasing means, and means for limiting the relative movement between said rod and said second movable core away from each other, said first biasing means being operative, when said first and second exciting coils are deenergized, to axially move said first movable core and said rod against the action of said second biasing means until said first movable core is urged against said stop means whereby all the movable components of said actuator are held stationary.

2. An electromagnetic actuator according to claim 1, wherein said first biasing means comprises a compression spring disposed between said first movable core and said first pole.

3. An electromagnetic actuator according to claim 1 or 2, wherein said second biasing means comprises a second compression spring disposed between the other end of said rod and said member to be actuated.

4. An electromagnetic actuator according to claim 1 or 2, wherein said second biasing means comprises a tension spring resiliently biasing said member to be actuated and said second movable core away from said second pole.

5. An electromagnetic actuator and valve assembly including:
   an electromagnetic actuator;
   valve means operatively connected to said actuator and actuated thereby to control the fluid flow through said valve means;
   said actuator comprising;
   a substantially cylindrical housing, first and second exciting coils disposed in said housing in axially aligned relationship, a fixed core having first and second poles positioned radially inwardly of said first and second coils, respectively, said fixed core defining therein an axial through-hole extending through said first and second poles, an axially elongated rod extending slidably through said axial through-hole, a first movable core disposed to cooperate with said first pole to define a first air gap and fixed to said rod adjacent to one end thereof for axial movement with said rod, stop means provided on said housing adjacent to said first movable core, first biasing means for resiliently biasing said first movable core axially toward said stop means, a second movable core disposed to cooperate with said second pole to define a second air gap and mounted on said rod for axial sliding movement thereon;
   said valve means comprising;
   a valve housing connected to the end of said actuator housing adjacent to said second movable core and defining fluid inlet and outlet and a fluid passage extending between said fluid inlet and outlet, a valve seat in said fluid passage between said fluid inlet and outlet and a valve member disposed in said fluid passage and connected to said second movable core of said actuator for movement therewith to cooperate with said valve seat to control the fluid flow through said fluid passage;
   second biasing means operative to bias said second movable core in the axial direction opposite to the direction in which said first movable core is biased by said first biasing means; and
   means for limiting the relative movement between said rod and said second movable core away from each other;
   the arrangement being such that said valve member is positioned at a first position in contact with said valve seat when said first coil is energized, such that said valve member is positioned at a second position remote from said valve seat when said second coil is energized and such that said valve member is positioned at a third position between said first and second positions when said first and second coils are both deenergized.

6. An electromagnetic actuator and valve assembly according to claim 5, wherein said first biasing means comprises a compression spring disposed between said first movable core and said first pole.

7. An electromagnetic actuator and valve assembly according to claim 5 or 6, wherein said second biasing means comprises a second compression spring disposed between the other end of said rod and said valve member.

8. An electromagnetic actuator and valve assembly according to claim 5 or 6, wherein said fluid inlet and outlet are disposed in said valve housing adjacent to the opposite ends thereof, respectively, said fluid passage extending in said valve housing axially thereof and substantially axially aligned with said rod, and wherein said second biasing means comprises a second compression spring disposed between the other end of said rod and said valve member.

9. An electromagnetic actuator and valve assembly according to claim 8, wherein said valve member has a hollow end extending around the other end of said rod and secured to said second movable core, said being provided on said rod adjacent to the other end thereof and housed in said hollow end portion of said valve member, and said second compression spring being disposed in said hollow end portion of said valve member and extending between the bottom of the hollow in said valve member and said limiting means.

10. An electromagnetic actuator and valve assembly according to claim 9, wherein said limiting means comprises an annular flange provided on and extending radially outwardly from said rod adjacent the other end thereof.

11. An electromagnetic actuator and valve assembly according to claim 9, further including means for exerting a force to said valve member against the force which is produced by the fluid pressure difference generated across said valve seat when said valve member is in said first position and which acts on said valve member and tends to urge the same against said valve seat.

12. An electromagnetic actuator and valve assembly according to claim 11, wherein said fluid inlet is disposed adjacent to said hollow end of said valve member, the other end of said valve member having a diameter smaller than that of said follow end portion of said valve member and extending loosely through said valve seat, said fluid outlet being disposed adjacent to the other end of said valve member, and wherein said force exerting means comprise an axially expansible bellows member disposed in said valve housing downstream of said valve seat and having an end operatively connected to the other end of said valve member, the other end of said bellows member being fixed to said valve housing, and a communication passage formed in and extending through said valve member to establish a fluid flow communication between the interior of said bellows member and said fluid passage in said valve housing upstream of said valve seat.

* * * * *